May 15, 1951  M. W. ARPS  2,553,160
FILM VIEWER
Filed June 7, 1948                    2 Sheets-Sheet 1
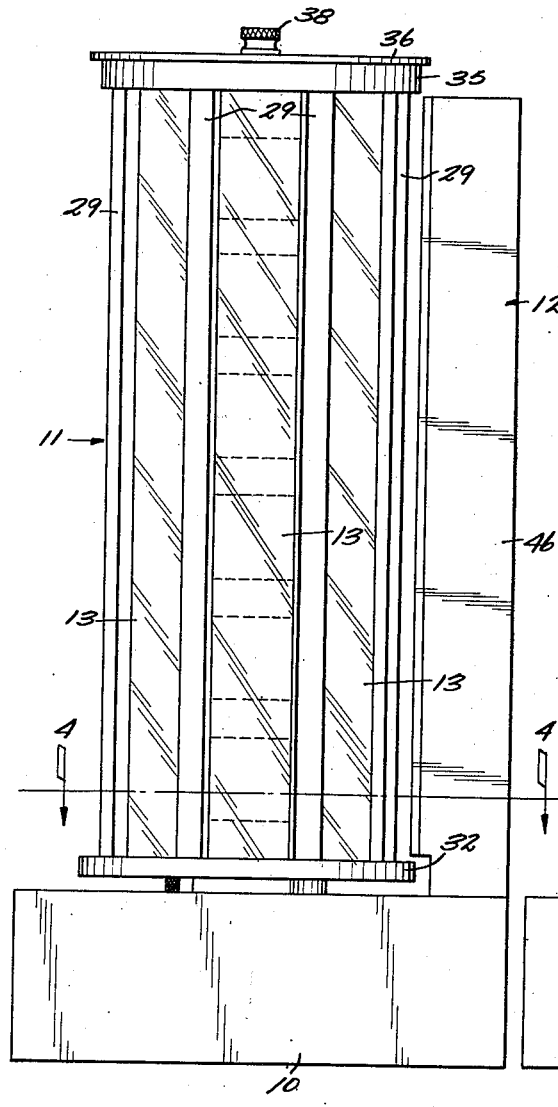
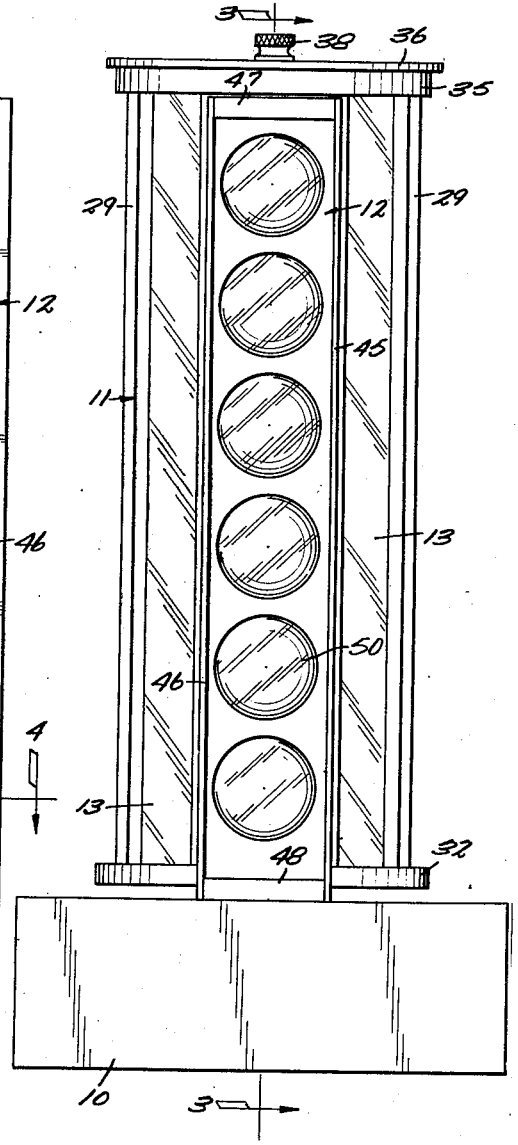
INVENTOR.
Mervin W. Arps,
BY Victor J. Evans & Co.
ATTORNEYS May 15, 1951  M. W. ARPS  2,553,160
FILM VIEWER
Filed June 7, 1948  2 Sheets-Sheet 2
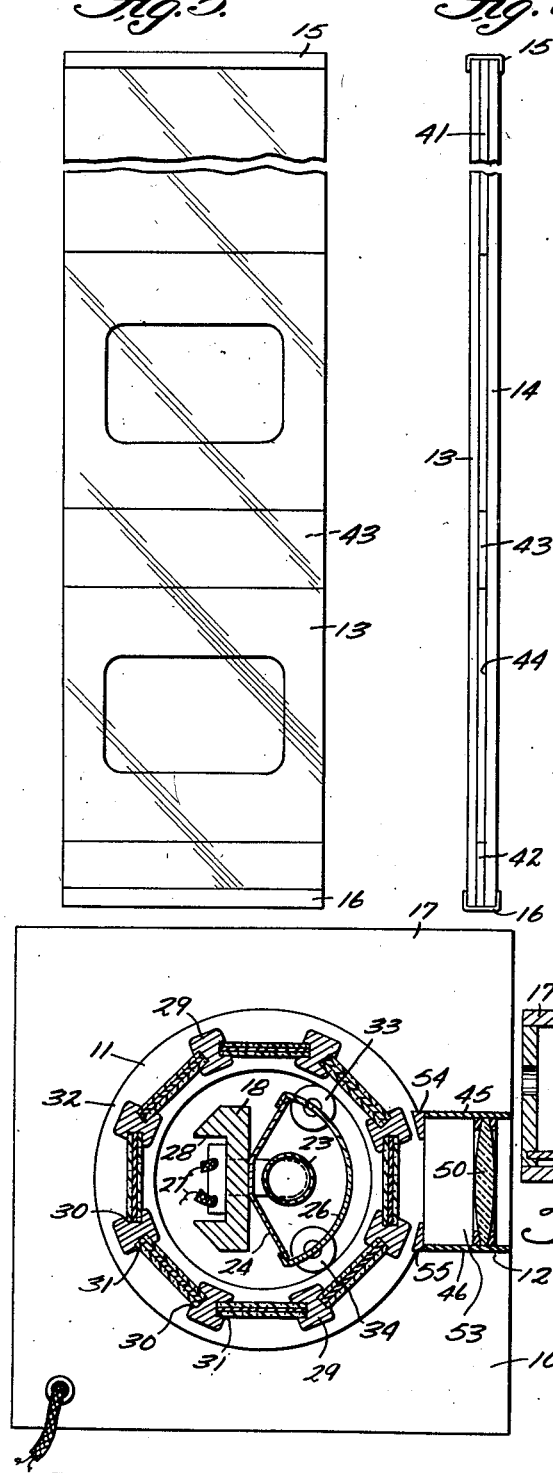
INVENTOR.
Mervin W. Arps,
BY Victor J. Evans & Co.
ATTORNEYS Patented May 15, 1951

2,553,160

UNITED STATES PATENT OFFICE 2,553,160

FILM VIEWER

Mervin William Arps, Arlington, Va.

Application June 7, 1948, Serial No. 31,540

5 Claims. (Cl. 40—77)

This invention relates to viewing devices for photographic film, color slides, and other transparencies, and in particular a revolving turret having a plurality of slides therein with a light in the center and a plurality of magnifying lenses registering with windows in the slides for viewing transparencies in the slides.

The purpose of this invention is to provide a device for displaying the maximum number of photographic transparencies in the minimum display space with the minimum number of magnifying lenses.

Various devices have been provided for viewing film, color film, negatives, and the like, however, with devices now in use it requires considerable time to inspect boxes of transparencies such as used in lectures, advertising, and the like. With this thought in mind this invention contemplates a vertically disposed turret-like housing having a plurality of spaced slides removably mounted in the wall thereof with a light in the center positioned to show through transparencies in the slides and with a series of magnifying lenses in a vertically positioned frame on one side of the housing.

The object of this invention is, therefore, to provide means for rotatably mounting a vertically disposed turret-like cylinder with transparent slides in the periphery so that transparencies in the slides may be viewed with a plurality of magnifying lenses at one side.

Another object of the invention is to provide a relatively small device for viewing a maximum number of transparencies in which the transparencies may readily be changed.

Another object of the invention is to provide a device for viewing transparencies through magnifying lenses with a light in which means is provided for diffusing the light.

A further object of the invention is to provide a transparency viewing device which is of a simple and economical construction.

With these and other objects and advantages in view the invention consists of the new and useful combination, construction, and arrangement of parts as hereinafter more fully described, set forth in the claims appended hereto, and disclosed in the accompanying drawings forming part hereof, wherein:

Figure 1 is a view showing a side elevation of the transparency viewing device.

Figure 2 is a view showing a front elevation of the device.

Figure 3 is a vertical section through the device taken on line 3—3 of Figure 2 with the fluorescent light tube shown in elevation.

Figure 4 is a sectional plan through the device taken on line 4—4 of Figure 1.

Figure 5 is a view showing a front elevation of one of the transparency holding slides with part broken away.

Fig. 6 shows a slide elevation of one of the slides with part broken away.

Referring now to the drawings wherein like references characters denote corresponding parts the device for viewing photographic transparencies of this invention includes a base 10, a turret 11, a lens frame 12, and a plurality of slides formed with transparent plates 13 and 14 held at the ends by U-shaped clips 15 and 16.

The base 10 is of box-like construction having side walls with a platform 17 on which a vertically disposed pedestal 18 is mounted with a bracket 19, as shown in Figure 3, and on the upper end of the pedestal is another bracket 20 on which the turret is rotatably mounted by a pin 21, which is secured in a cross member 22. The brackets 19 and 20 provide terminals for a fluorescent tube 23 and a reflector 24 is mounted behind the tube on the pedestal by screws 25. An arcuate light diffusing shield 26 is provided in front of the tube with the edges thereof held on the edges of the reflector whereby the light rays from the tube are equally distributed over the transparencies. The terminals of the brackets 19 and 20 are connected by a suitable electric cord 27 to a source of current and the cord is positioned in a recess 28 in the rear of the pedestal.

The turret 11 is formed with a plurality of spaced ribs 29 having slots 30 and 31 in the sides thereof and the lower ends of the ribs are mounted on a ring 32, the inner edge of which engages circular guide posts 33 and 34 on the platform 17. The upper ends of the ribs are held by a band 35 and a cover plate 36 with ventilating openings 37 therein is clamped on the upper end by a thumb nut 38 on the pin 21. A disc 39 is provided on the under surface of the cover plate, which is rotatably mounted on the pin 21 and the disc is spaced from the cross member 22 by a nut 40.

The ends of the transparent plates 13 and 14 are held by the clips 15 and 16 and the plates are held in spaced relation by strips 41 and 42 at the ends, and strips 43 intermediate of the ends and between the frames. The transparencies are slid into the open spaces 44 between the spacing strips, and the slides are freely held in the slots 30 and 31 of the ribs 29, as shown in Figure 4. The transparencies are readily interchangeable in the slides and the slides may readily be removed from and replaced in the turret, by removing the cover plate 36.

The lens frame 12 is formed with side plates 45 and 46 connected at the upper ends by a member 47 and with the lower ends mounted on a base 48 which is held to the platform 17 by a U-bolt 49. Lenses 50 are mounted between plates 51 and 52 and horizontally disposed transverse partitions 53 are provided between the lenses. The inner side of the lens frame is provided with tapered strips 54 and 55 which are spaced to provide an opening that corresponds with the spaces between the ribs of the turret.

With the parts arranged in this manner films, color films, or other transparencies may be inserted in the slides and with the slides positioned in the turret the turret may be rotated to bring the slides in viewing position in relation to the lenses so that by looking through the lenses the transparencies may be observed on an enlarged scale.

It will be understood that modifications may be made in the design and arrangement of the parts without departing from the spirit of the invention.

What is claimed is:

1. In a machine for viewing transparencies and the like, the combination, which comprises, a box-like base, a centrally positioned pedestal extending upwardly from the base, light terminals extending outwardly from the upper and lower ends of the pedestal, a fluorescent light tube held by the terminals, a reflector on the pedestal behind the light tube, a light diffusing shield in front of the tube, a turret having a plurality of spaced transparency holding slides removably held in the outer surface, means rotatably mounting the turret on the pedestal, and a plurality of superimposed magnifying lenses mounted on the base and positioned at one side of the turret, said lenses aligned with the transparencies in the slides and also with the light tube.

2. A machine for viewing transparencies as described in claim 1, wherein the lenses are mounted in a vertically disposed rectangular-shaped frame having horizontally positioned transverse partitions between the lenses.

3. A machine for viewing transparencies as described in claim 1, wherein the turret is provided with a removable cover whereby the slides may be removed and replaced.

4. A machine for viewing transparencies as described in claim 1, wherein the slides comprise spaced transparent plates with spacing strips therebetween and with the ends held by U-shaped clips.

5. In a transparency viewer, the combination which comprises a base, a vertically disposed pedestal having mounting brackets on the upper and lower ends positioned on the base, a reflector carried by the pedestal and having outwardly diverging walls with the outer edges of the walls connected by an arcuate transparent panel, a light carried by the pedestal and positioned in the reflector, a cylindrical frame having spaced vertically disposed film receiving slots therein positioned over the pedestal and journaled on the upper end thereof, a vertically disposed box-like casing having spaced horizontally disposed partitions therein mounted on the base and positioned at one side of the said cylindrical casing, and enlarging lenses mounted in the outer face of the said vertically disposed box-like casing and positioned between the said horizontally disposed partitions whereby the said enlarging lenses are postioned to register with film positioned in the film receiving slots of the cylindrical frame, and said film receiving slots being positioned in side surfaces of spaced vertically disposed ribs of the cylindrical frame.

MERVIN WILLIAM ARPS.

REFERENCES CITED

The following references are of record in the file of this patent:

UNITED STATES PATENTS

| Number | Name | Date |
| --- | --- | --- |
| 616,826 | Daly | Dec. 27, 1898 |
| 838,075 | Brown | Dec. 11, 1906 |
| 1,350,042 | Stealy | Aug. 17, 1920 |
| 1,444,339 | Faulkner | Feb. 6, 1923 |
| 1,697,753 | Cannon | Jan. 1, 1929 |
| 1,744,647 | Lamar | Jan. 21, 1930 |
| 2,178,155 | Williams | Oct. 31, 1939 |
| 2,239,032 | Boch | Apr. 22, 1941 |
| 2,436,162 | Cadenas | Feb. 17, 1948 |